US007024563B2

(12) United States Patent
Shimosato et al.

(10) Patent No.: US 7,024,563 B2
(45) Date of Patent: Apr. 4, 2006

(54) APPARATUS, SYSTEM AND METHOD FOR AUTHENTICATING PERSONAL IDENTITY, COMPUTER READABLE MEDIUM HAVING PERSONAL IDENTITY AUTHENTICATING PROGRAM RECORDED THEREON METHOD OF REGISTERING PERSONAL IDENTITY AUTHENTICATING INFORMATION, METHOD OF VERIFYING PERSONAL IDENTITY AUTHENTICATING INFORMATION, AND RECORDING MEDIUM HAVING PERSONAL IDENTITY AUTHENTICATING INFORMATION RECORDED THEREON

(75) Inventors: Hideto Shimosato, Nagano-ken (JP); Yuichi Ushiyama, Nagano-ken (JP); Kazuto Mogami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 919 days.

(21) Appl. No.: 09/962,336

(22) Filed: Sep. 26, 2001

(65) Prior Publication Data

US 2002/0049908 A1    Apr. 25, 2002

(30) Foreign Application Priority Data

Sep. 26, 2000    (JP)    ............................. 2000-292500

(51) Int. Cl.
*H04L 9/00*    (2006.01)
(52) U.S. Cl. ....................................... 713/186; 713/176
(58) Field of Classification Search ................ 713/168, 713/172–173, 176, 185–186; 340/5.8–5.84; 382/115–119, 124; 283/74–75, 77–78, 112–113
See application file for complete search history.

(56) References Cited

U.S. PATENT DOCUMENTS

| 4,993,068 | A | * | 2/1991 | Piosenka et al. ............ 713/186 |
| 5,384,846 | A | * | 1/1995 | Berson et al. .............. 713/186 |
| 5,436,970 | A | * | 7/1995 | Ray et al. .................... 713/186 |
| 5,757,918 | A | * | 5/1998 | Hopkins ....................... 705/67 |
| 5,913,542 | A | * | 6/1999 | Belucci et al. ................ 283/75 |
| 6,167,518 | A | * | 12/2000 | Padgett et al. .............. 713/186 |
| 6,189,096 | B1 | * | 2/2001 | Haverty ..................... 713/155 |
| 6,401,206 | B1 | * | 6/2002 | Khan et al. ................. 713/176 |
| 6,754,822 | B1 | * | 6/2004 | Zhao .......................... 713/176 |
| 6,775,775 | B1 | * | 8/2004 | Yoshiura et al. ............ 713/186 |

OTHER PUBLICATIONS

Chow, S. et al, "Forgery and Tamper-Proof Identification Document", 1993, IEEE, pp. 11-14.*
Nikkei Systems provider 2000, No. 7, p. 9.

* cited by examiner

*Primary Examiner*—Gilberto Barron, Jr.
*Assistant Examiner*—Minh Dinh
(74) *Attorney, Agent, or Firm*—Sughrue Mion, PLLC

(57) ABSTRACT

A personal identity authenticating system where the registrant/cardholder and the registrar are assigned specific identifiers and secret keys and public keys that are mapped to the identifiers at the authentication support station (ASS). Personal identity to which the registrar identifier is attached is encrypted with the registrant/cardholder's secret key. Personal identity data is embedded as an encrypted watermark image data by means of the registrar's secret key. Both encrypted identity and watermarked image data are recorded on the IC card. When authentication is required, the identity data with the registrar identifier is decrypted with the cardholder's public key that is supplied by the ASS. The registrar's public key is obtained from the ASS by using the decrypted registrar identifier. The registrar's public key permits the personal identity to be retrieved from the watermarked image data. Internal authentication is executed by matching between personal identity strings and image data.

8 Claims, 18 Drawing Sheets

FIG.8

| Identifier | Public key | Secret key |
|---|---|---|
| ⋮ | ⋮ | ⋮ |
| BBB 678901 (Registrant/Card holder) | OP | OS |
| ⋮ | ⋮ | ⋮ |
| AAA 012345 (Registrar) | VP | VS |
| ⋮ | ⋮ | ⋮ |

APPARATUS, SYSTEM AND METHOD FOR AUTHENTICATING PERSONAL IDENTITY, COMPUTER READABLE MEDIUM HAVING PERSONAL IDENTITY AUTHENTICATING PROGRAM RECORDED THEREON METHOD OF REGISTERING PERSONAL IDENTITY AUTHENTICATING INFORMATION, METHOD OF VERIFYING PERSONAL IDENTITY AUTHENTICATING INFORMATION, AND RECORDING MEDIUM HAVING PERSONAL IDENTITY AUTHENTICATING INFORMATION RECORDED THEREON

BACKGROUND OF THE INVENTION

1. Field of the Invention

The present invention relates to an apparatus, system and method for authenticating personal identity, a computer readable medium having personal identity authenticating program recorded thereon, a method of registering personal identity authenticating information, a method of verifying personal identity authenticating information, and a recording medium having personal identity authenticating information recorded thereon.

2. Description of the Prior Art

In recent years, a diversity of techniques have been devised to enhance the security of electronic settlement and these techniques are aimed at preventing settlement or charge data on a credit card from being falsified and correctly notifying the credit card issuer of that data.

Meanwhile, making sure whether the person who has a credit card is the true cardholder is another matter. Even if countermeasures are taken so that the settlement or charge data on the card will not be falsified, they will be pointless unless the card is used by the true cardholder. Conventionally, the judgment as to whether the person who has a credit card is the true cardholder is made by judging whether there is matching in handwriting between the signature put to the back of the card and the signature written on a slip by the person. Alternatively, such judgment is made by comparing the person who has the card and the cardholder's identification photograph printed on the credit card.

In the above conventional method of confirming that the person who has a credit card is the true credit cardholder, the following abuse of cards is conceivable as a threat to security. If someone steals a credit card, practices writing a signature to imitate the signature put onto the card, and comes to write it well enough to deceive a clerk or the like, the clerk cannot discriminate between the stealer who has the card and the true cardholder.

On the other hand, the identification photograph may appear to be effective in discriminating between the true cardholder and a different person who has a credit card. However, it is not difficult for the stealer to prepare a fake credit card, attach his or her face photograph to it, and writes the same magnetic signals as encoded on the stolen card onto the fake card.

SUMMARY OF THE INVENTION

To address the above-described matters, the object of the present invention is to provide a personal identity authenticating apparatus, a recording medium having personal identity authenticating information recorded thereon, a personal identity authenticating system, a method of authenticating personal identity, a computer readable medium having a personal identity authenticating program stored thereon, a method of registering personal identity authenticating information, and a method of verifying personal identity authenticating information which can enhance the security of identification that is required for electronic settlement or the like.

To achieve the above object, the present invention is constituted in one aspect such that it comprises:

a read means for reading a registrant's image data and identity data from a recording medium on which the two data are individually encrypted with two secret keys and then recorded, the secret keys belonging to two pairs of secret keys and public keys that are mapped to their identifiers at an authentication support station;

a decryption and checking means for decrypting the encrypted data with the public keys and for checking the decrypted data for consistency of its contents, each of the public keys being matched with said identifier;

an image confirmation means for presenting an image from the decrypted image data and for accepting a result of authentication; and a permission means for granting permission according to the checking result of said decryption and checking means and the result of said image confirmation means.

If the invention is constituted as above, initially, image data and identity data proper to the registrant who will be the cardholder are recorded on the recording medium. At this time, the data is not simply recorded. The registrant identity is encrypted with a secret key paired with a public key and moreover encrypted with another secret key paired with another pubic key, using two pairs of secret keys and public keys which are managed such that each pair is mapped to the identifier of a registrant or registrar to which the pair belongs at an authentication support station. The thus double encrypted identity data is recorded. Accordingly, when such double encrypted data is decrypted, the public keys corresponding to the secret keys must be used and the pubic keys can be obtained from the authentication support station by requesting the station to supply each public key, according to the identifier specified with the request.

On the personal identity authenticating apparatus, on the other hand, its read means reads the above data from the above recording medium. The decryption and matching means decrypts the double encrypted identity data, respectively using the public keys corresponding to the secret keys and checks matching between both personal identity strings retrieved by decryption. The public keys are obtained by requesting the authentication support station to supply each public key, according to the registrant or registrar identifier specified with the request. Without the public key pared with the secret key used for encrypting data, the data cannot be decrypted. Only after both of the double encrypted data can be decrypted, matching becomes possible. If a mismatch is detected, any falsification or wrong use of the data can be inferred. The image of identical person confirmation means presents a personal image from the image data to let the operator in charge authenticate the cardholder and accepts the result of authentication. Only if both the result of matching and the result of authentication are good, the permission means permits the cardholder to use the card of the recording medium.

This method of enhancing the security by using two pairs of secret keys and public keys can be implemented not necessarily only in the aspect of the personal identity authenticating apparatus, but also can be applied to a recording medium having the above data recorded thereon. Thus, in another aspect, the present invention is constituted as a recording medium having personal identity authenticating information recorded thereon, which is to have registrant image data and identity data recorded thereon, said identity data being encrypted with a secret key paired with a public key and with another secret key paired with another pubic key, using two pairs of secret keys and public keys which are managed such that each pair is mapped to the identifier thereof at an authentication support station.

As a combination of both, in yet another aspect, the present invention is constituted as a personal identity authenticating system comprising:

an authentication support station at which secret key and public key pairs are managed such that each pair is mapped to the identifier of a registrant or registrar to which the pair belongs;

a registry terminal which encrypts image data and identity data and writes encrypted data onto a recording medium; and a personal identity authenticating terminal which reads the encrypted data from said recording medium, decrypts said image data and said identity data, and checks the decrypted data for consistency of its contents, wherein:

said registry terminal receives and stores the input of image data generated by capturing a part of the body of the registrant, and the input of the registrant's identity data, encrypts the identity data with the registrant's secret key and with the registrar's secret key respectively, and writes the image data and encrypted identity data onto said recording medium of the registrant, said personal identity authenticating terminal decrypts the double encrypted data respectively with the registrant's and registrar's public keys which are obtained from said authentication support station by specifying either the registrant or registrar identifier and performs matching between both identity data decrypted with each public keys, and moreover presents a image from said image data and accepts the input of confirmation.

The foregoing method is not necessarily applied to the apparatus entity only and it will be easily understandable that the method functions as such. Thus, in a further aspect, the present invention is constituted as a method of authenticating personal identity, using secret key and public key pairs which are managed such that each pair is mapped to the identifier of a registrant or registrar to which the pair belongs at an authentication support station, said method comprising:

encrypting image data and identity data and writing encrypted data onto a recording medium at a registry site; and reading the encrypted data from said recording medium, decrypting said image data and said identity data, and checking the decrypted data for consistency of its contents at a personal identity authenticating site;

at the registry site, said method further comprising:

receiving and storing the input of image data generated by capturing a part of the body of the registrant;

receiving and storing the input of the registrant's identity data;

encrypting the identity data with the registrant's secret key;

encrypting the identity data with the registrar's secret key; and writing the image data and encrypted identity data onto said recording medium of the registrant;

at the personal identity authenticating site, said method further comprising:

decrypting the double encrypted data respectively with the registrant's and registrar's public keys which are obtained from said authentication support station by specifying the registrant or registrar identifier;

performing matching between both identity data decrypted with each public keys;

presenting a personal image from said image data; and accepting the input of confirmation.

The invention is not necessary embodied as the authenticating apparatus entity, but also provides an effective method of such authentication.

Meanwhile, the foregoing personal identity authenticating apparatus may exist and function singly or may be assembled into equipment or a system. Not limited to those set forth herein, the concept of the invention comprehends a variety of modes or forms in which the invention is embodied. Therefore, the invention can be implemented in software or hardware and modifications thereto are possible without departing from the spirit or essential characteristics thereof.

If an illustrative embodiment of the present invention concept is software implementation of the personal identity authenticating method, the computer readable medium on which the software has been recorded is the entity of the invention and will be put to use.

As an example, in a still further aspect, the present invention is constituted as a computer readable medium having a personal identity authenticating program recorded thereon, said program based on authentication using secret key and public key pairs which are managed such that each pair is mapped to the identifier of a registrant or registrar to which the pair belongs at an authentication support station, said program comprising:

a subprogram to run on a registry workstation for encrypting image data and identity data and writing encrypted data onto a recording medium; and a subprogram to run on a personal identity authenticating workstation for reading the encrypted data from said recording medium, decrypting said image data and said identity data, and checking the decrypted data for consistency of its contents;

said subprogram to run on a registry workstation comprising the functions of:

receiving and storing the input of image data generated by capturing a part of the body of the registrant;

receiving and storing the input of the registrant's identity data;

encrypting the identity data with the registrant's secret key;

encrypting the identity data with the registrar's secret key; and writing the image data and encrypted identity data onto said recording medium of the registrant;

said subprogram to run on a personal identity authenticating workstation comprising the functions of:

decrypting the double encrypted data respectively with the registrant's and registrar's public keys which are obtained from said authentication support station by specifying the registrant or registrar identifier;

performing matching between both identity data decrypted with each public keys;

presenting a personal image from said image data; and accepting the input of confirmation.

Of course, the recording medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt.

Furthermore, even if part of the present invention is implemented by software and the remaining part is implemented by hardware, this does not differ at all from those set forth herein in the concept of the invention. The present invention may be implemented in such a manner that part of the invention is recorded on a recording medium in advance and will be read appropriately as required.

The software implementation of the present invention may be combined with hardware and an operating system or may be independent of the hardware and the operating system. Even if the software is actually run under an operating system, it will be understandable that the invention can be carried out by only the program during the process of distributing the medium having the program recorded thereon.

If the present invention is carried out by the software, the invention is not only realized as the medium having the program recorded thereon, but also, of course, realized as the program. Therefore, the present invention includes the program as such.

As described above, the present invention can provide a personal identity authenticating apparatus, a recording medium having personal identity authenticating information recorded thereon, a personal identity authenticating system, a method of authenticating personal identity, a computer readable medium having a personal identity authenticating program stored thereon, a method of registering personal identity authenticating information, and a method of verifying personal identity authenticating information which achieve extremely high security and can prevent image data and identity data from being falsified by using two pairs of secret keys and public keys.

To enhance the security by using two pairs of secret keys and public keys, a variety of modifications can be made to the present invention. As an example of modification, in a further aspect of the present invention, the foregoing personal identity authenticating apparatus is constituted such that:

first identifier mapped to one pair of secret and public keys is encrypted with the secret key of the other pair of secret and public keys; and said decryption and checking means obtains one of said public keys from said authentication support station by specifying the second identifier and requesting the station to supply the public key mapped to said first identifier, decrypts said one of encrypted data encrypted together with said first identifier by the obtained public key, obtains the other public key from said authentication support station by specifying the decrypted first identifier and requesting the station to supply the other public key, and decrypts the other encrypted data with the thus obtained public key.

If the invention is constituted to include the above aspect, one identifier mapped to one pair of secrete and public keys is encrypted with the secret key of the other pair of secret and public keys and attached to either personal identity data that is recorded onto the recording medium. The decryption and matching means obtains one public key from the authentication support station by specifying the other identifier and requesting the station to supply the public key mapped to the other identifier, decrypts the personal identity data encrypted together with the former identifier by the obtained public key, obtains the other public key from the authentication support station by specifying the decrypted identifier and requesting the station to supply its public key, and decrypts the other personal identity data with the thus obtained public key. That is, if only one identifier is known initially, double encrypted data can be decoded one by one by using it.

As application of the foregoing, in yet further aspect of the present invention, the above-described recording medium having personal identity authenticating information recorded thereon is constituted such that one identifier mapped to one pair of secret and public keys is encrypted with the secret key of the other pair of secret and public keys.

In a still further aspect of the present invention, the foregoing personal identity authenticating system is constituted such that:

said registry terminal encrypts said image data and said identity data together with the registrar identifier with the registrant's secret key and encrypts said image data and said identity data with the registrar's secret key; and said personal identity authenticating terminal obtains the registrant's public key from said authentication support station by specifying registrant identifier and decrypts the encrypted data including the registrar identifier with the registrant public key, and moreover obtains the registrar's public key from said authentication support station by specifying the registrar identifier obtained by the preceding decryption and decrypts the remaining encrypted data with the registrar's public key.

According to the present invention, identifiers can be decrypted one by one in this way. Even if a plurality of secret key and public key pairs are used, only one identifier must be obtained at first, but it is not necessary to memorize as many identifiers as the number of pairs.

In yet another aspect of the present invention, the foregoing personal identity authenticating apparatus is constituted such that:

parameters for preventing one of image data and identity data from being falsified are encrypted together with another data, both data being recorded on said recording medium; and said decryption and checking means checks the former data for consistency of its contents with the parameters to be decrypted from the latter data.

If the invention is constituted to include the above aspect, because parameters for preventing either personal identity data from being falsified are encrypted together with the other personal identity data and both data are recorded on the recording medium, the decryption and matching means checks the former data for falsification by using the falsification preventing parameters decrypted from the latter data. Of course, it is possible to include the falsification preventing parameters in both data and the parameters may be computed for encrypted data or data before encrypted.

The falsification preventing parameters for one data are included in the other data, so that falsified data can easily be detected.

As application of the foregoing, in yet further aspect of the present invention, the above-described recording medium having personal identity authenticating information recorded thereon is constituted such that parameters for preventing one of image data and identity data from being falsified are encrypted together with another data.

In a still further aspect of the present invention, the foregoing personal identity authenticating system is constituted such that:

during the encryption process on the registry terminal, parameters for preventing data encrypted by either the registrant's secret key or registrar's secret key from being falsified are included in encrypting data with the other secret key; and said personal identity authenticating terminal obtains the falsification preventing parameters by decrypting the data including the parameters with either registrant's public key or the registrant's public key and checks the other data for falsification by using the thus obtained parameters.

According to the present invention, data can be checked for falsification by including the falsification preventing parameters in this way and security can be enhanced.

Because image data is processed, encryption can also be accomplished by digital watermarking. The term, encryption in the present specification has a rather wide meaning, that is, digital watermarking is substantially included in encryption.

As an example, in yet another aspect of the present invention, the foregoing personal identity authenticating apparatus is constituted such that:

said identity data is encrypted by embedding its encrypted digital watermark into said image data and recorded on said recording medium; and said decryption and checking means extracts the identity data as the digital watermark from the image data by the public key paired with the secret key used for encryption and checks the image data for falsification during the extraction process.

If the invention is constituted to include the above aspect, identity is encrypted by embedding its encrypted digital watermark into the image data and recorded on the recording medium. The decryption and matching means extracts the identity as the digital watermark from the image data by the public key paired with the secret key used for encryption and checks the image data for falsification during the extraction process.

In this way, digital watermarking can serve double purposes: encryption and prevention of falsification.

As application of the foregoing, in yet further aspect of the present invention, the above-described recording medium having personal identity authenticating information recorded thereon is constituted such that said identity data is encrypted by embedding its encrypted digital watermark into said image data and recorded on the medium.

In a still further aspect of the invention, the foregoing personal identity authenticating system is constituted such that:

said registry terminal embeds a digital watermark consisting of said identity data into said image data by means of the registrar's secret key; and said personal identity authenticating terminal extracts the identity data from the watermarked image data by means of the registrar's public key.

According to the present invention, it becomes possible to perform both encryption and prevention of falsification by embedding a digital watermark of identity into image data.

A diversity of matching methods can be taken. By way of example, in yet another aspect of the present invention, the foregoing personal identity authenticating apparatus is operated as follows. The identity data is double encrypted with the respective secret keys and recorded on said recording medium; and the decryption and checking means performs matching between both identity data retrieved by decrypting the double encrypted data respectively with the public keys corresponding to the secret keys used for encryption.

If the invention is constituted to include the above aspect, the decryption and matching means performs matching between both identity strings retrieved by decrypting the double encrypted data respectively with the public keys corresponding to the secret keys used for encryption.

Because identity is double encrypted, even if one encrypted can be falsified, a mismatch is detected unless the other encrypted data can be falsified as well. Matching is not limited to exact agreement between both identity strings. The characters in both strings may be arranged such that they create a meaning when the strings are coupled and if this takes place, matching is confirmed.

Similarly, in yet another aspect of the present invention, the above-described recording medium having personal identity authenticating information recorded thereon is constituted such that said identity data is double encrypted with the respective secret keys.

According to the present invention, it is relatively easy to perform matching check by matching the retrieved identity strings in this way.

Because image data is used to authenticate personal identity, in a still further aspect of the present invention, the personal identity authenticating apparatus is constituted such that said image data is an image generated by capturing a part of the person's body that serves the identification purpose.

If the invention is constituted to include the above aspect, image data that is an image generated by capturing a part of the person's body that serves the identification purpose is recorded on the medium. Even if matching between the retrieved identity strings has been confirmed, whether the displayed image is different from the identical person of the cardholder is promptly judged, and authenticating the person as the cardholder can be performed exactly. To replace the image with another, the secret key used for encryption on the image is necessary and it is substantially impossible to do.

Similarly, in a still further aspect of the present invention, the above-described recording medium having personal identity authenticating information recorded thereon is constituted such that said image data is an image generated by capturing a part of the person's body.

According to the present invention, by using such image of a part of the registrant's body, finally, the operator in charge can visually and easily confirm whether the person who is going to use the card is the cardholder.

Furthermore, in yet another aspect, the present invention is constituted as a method of registering personal identity authenticating information, using secret key and public key pairs which are managed such that each pair is mapped to the identifier of a registrant or registrar to which the pair belongs at an authentication support station, said method comprising:

receiving and storing the input of image data representing the peculiarity of a person, the registrant who will be the cardholder of an IC card;

receiving and storing the input of identity data of said registrant;

encrypting said image data and said identity data by means of the registrar's secret key;

encrypting said identity data together with the registrar identifier by the registrant's secret key; and recording the encrypted data on the IC card, thus registering the identity of the registrant.

In a still further aspect, the present invention is constituted as a method of verifying personal identity authenticating information, using secret key and public key pairs which are managed such that each pair is mapped to the identifier of a registrant or registrar to which the pair belongs at an authentication support station, said method comprising:

obtaining the public key of the cardholder of an IC card from said authentication support station by specifying the cardholder identifier;

decrypting one encrypted data from the IC card with said public key, thereby retrieving the identity data and the registrar identifier;

obtaining the public key of the registrar from said authentication support station by specifying the registrar identifier;

decrypting the other encrypted data from the IC card with the registrar's public key, thereby retrieving the identity data and image data;

checking the retrieved data for falsification; and rendering the result of the check and the image data usable.

These methods are to be used in the site of registration and the site of payment, respectively.

As described above, according to the present invention, a method of authenticating personal identity can be provided which makes actual operator's work in the site simple and effective.

Other and further objects, features and advantages of the invention will appear more fully from the following description.

BRIEF DESCRIPTION OF THE DRAWINGS

A preferred form of the present invention illustrated in the accompanying drawings in which:

FIG. 8 shows the structure of a database managed on the authentication support station;

DETAILED DESCRIPTION OF THE PREFERRED EMBODIMENTS

With reference to the appended drawings, a preferred embodiment of the present invention will now be described. A personal identity authenticating system of the present invention is operated, based on the following assumption. A person who wants to use an IC card must register his or her identity and image data with a registry terminal that writes the identity and image data onto the IC card at the place of a registrar of business. The person who got the IC card can pay with the card for something to buy or to pay his or her bill or check, when the personal identity is authenticated by the above system. Settlement or actual payment to take place after personal identity authentication and charging on the card is based on any of the settlement systems that are now existing and will be developed in future. In this specification, authentication and preceding processes are discussed.

Figure 1:
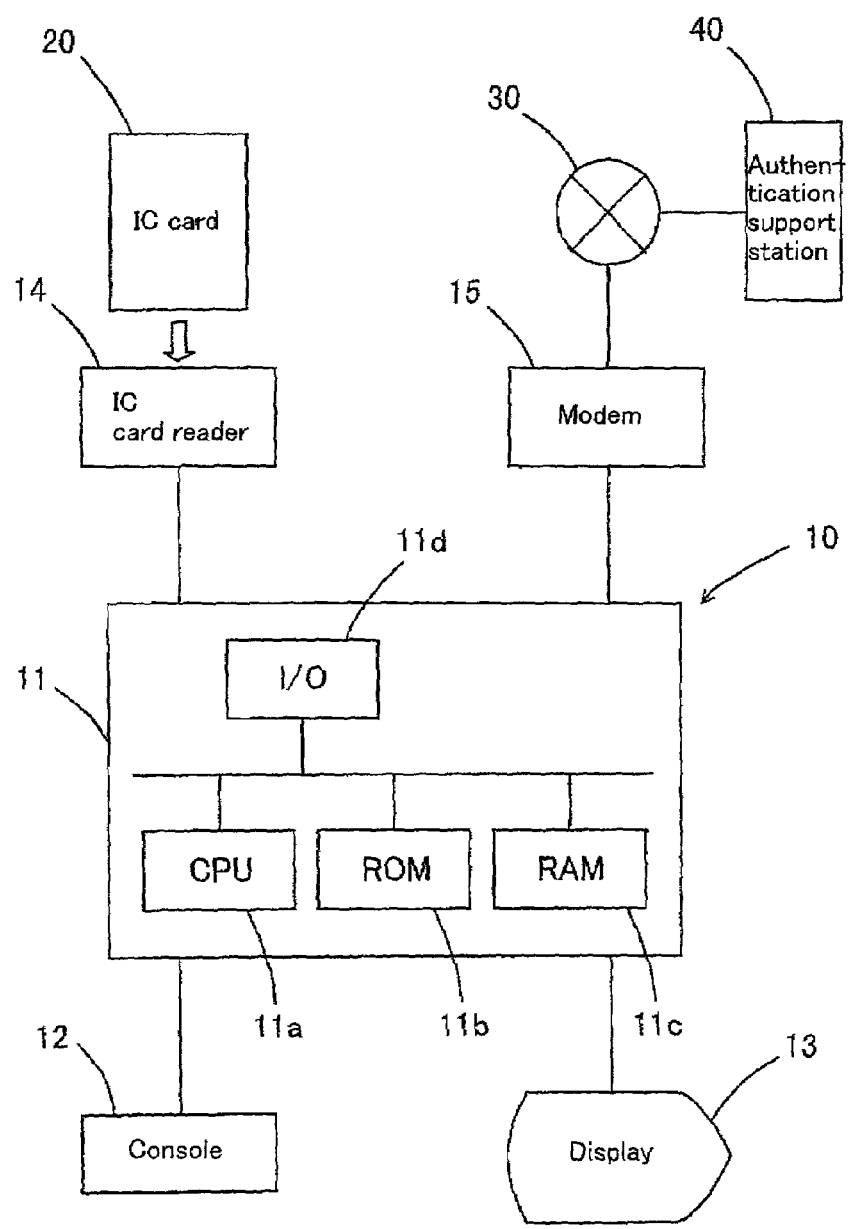
FIG. 1 is a block diagram of a POS (Point of Sales) terminal to which the personal identity authenticating apparatus according to a preferred embodiment of the present invention is applied.
Figure 2:
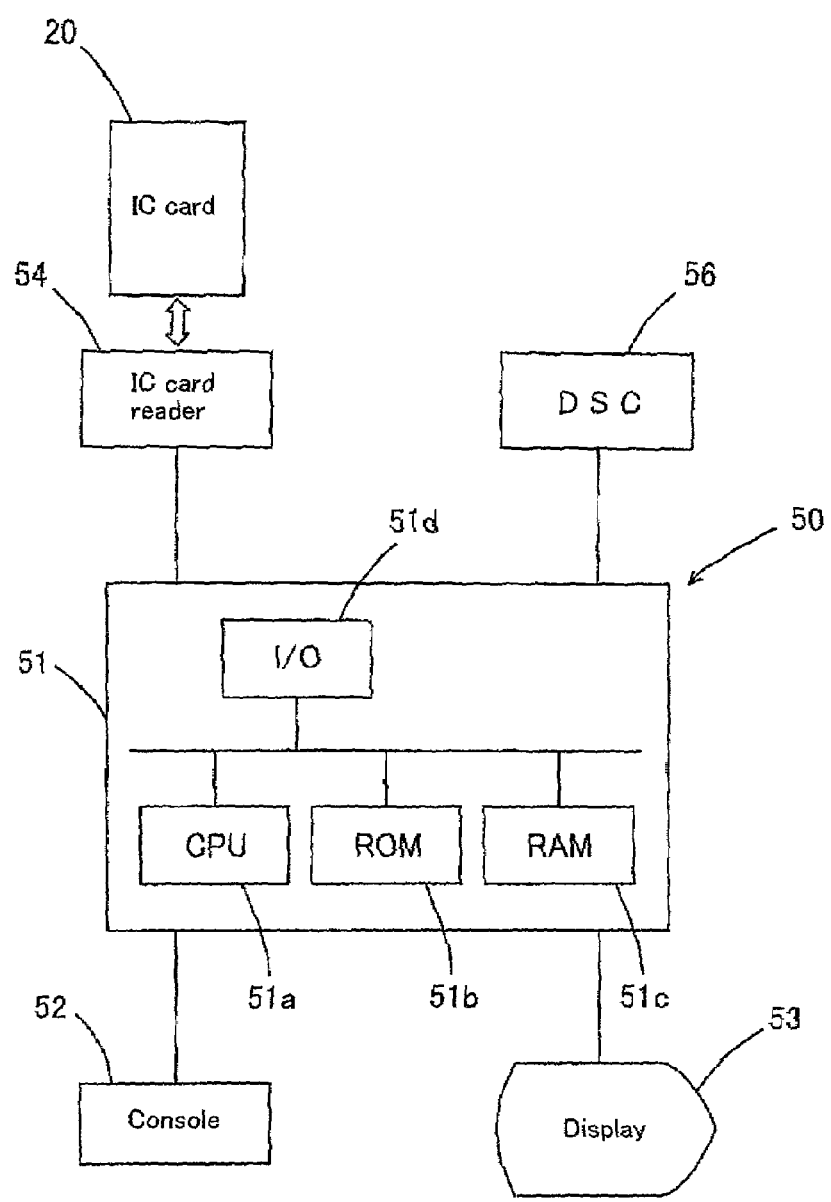
FIG. 2 is a block diagram of a registry terminal to which the personal identity authenticating apparatus (system) according to the preferred embodiment of the present invention is applied.
Figure 3:
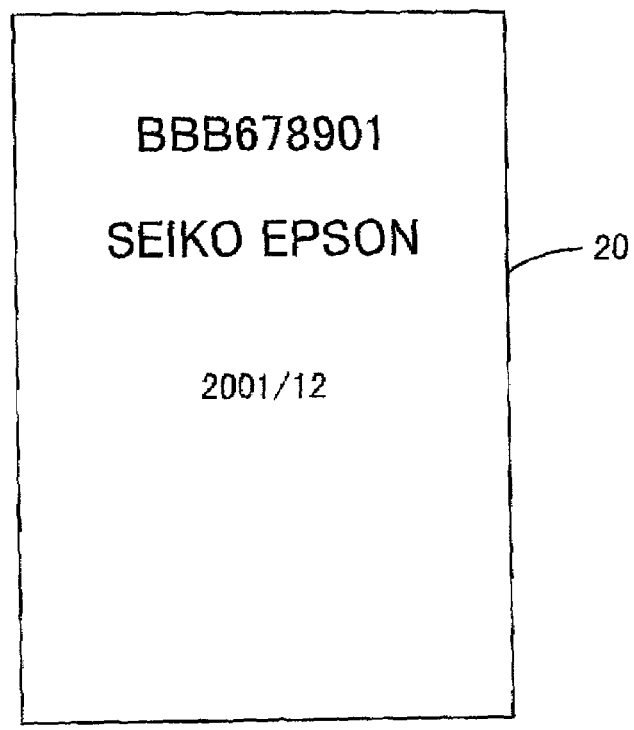
FIG. 3 shows the appearance of an IC card example.

FIG. 1 presents a block diagram of a POS (Point of Sales) terminal to be operated when the IC cardholder pays with the card for purchases or something to pay, the terminal being included in the personal identity authenticating system as a preferred embodiment of the present invention. FIG. 2 presents a block diagram of a terminal device to be operated at the place of the registrar of business; this terminal is also included in the preferred embodiment. FIG. 3 shows the appearance of the IC card as a data medium.

In FIG. 1, the POS terminal 10 is comprised of a main unit of control 11, a console 12 for input operation, a display 13 on which input data, computing information, and a personal image which will be described later are displayed, an IC card reader 14 into which an IC card 20 is inserted, a modem 15 for communication with a external authentication support station 40 via a public telephone network 30. The main unit of control 11 comprises a CPU 11a for computing, a ROM 11b to store programs and data, a RAM 11c to be used as a working area or the like, and an I/O unit 11d for electrically connecting to external devices.

Referring to FIG. 2, on the other hand, the registry terminal 50 is comprised of a main unit of control 51, a console 52 for input operation, a display 53 on which input data, computing information, and a personal image which will be described later are displayed, an IC card reader/writer 54 into which an IC card 20 is inserted so that data will be written onto the card, a digital camera (DSC) 56 which captures a personal image and outputs image data. Although, in FIG. 2, a modem to connect the terminal to the public telephone network 30 is not shown, the terminal may be equipped with the modem. The main unit of control 51 comprises a CPU 51a, ROM 51b, RAM 51c, and I/O unit 51d.

Figure 4:
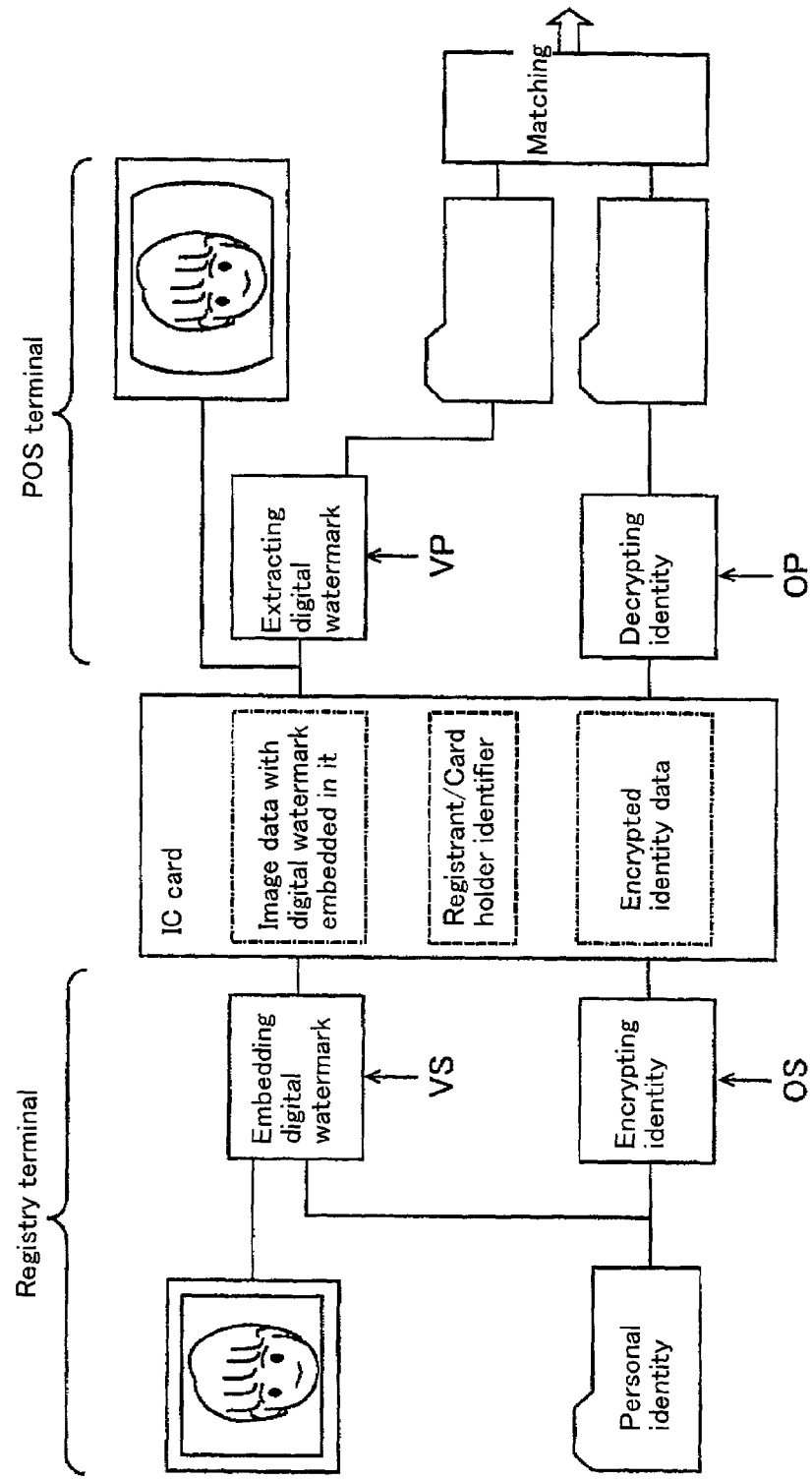
FIG. 4 is a schematic diagram representing data encryption and decryption processes.

FIG. 4 shows the outline of data processing when carrying out the personal identity authentication with the above-mentioned hardware units. In brief, on the registry terminal 50, personal image data and identity are respectively encrypted with two secret keys, one key being of the registrant and the other being of the registrar, and written onto the IC card 20. On the POS terminal 10, the image data and identity data are decrypted with two public keys corresponding to the registrant's and registrar's secret keys. During this process, it is almost impossible to alter or falsify the data if the present personal identity authenticating system is used and a high degree of security can be assured.

Application of the present invention using both the registrant's and registrar's secret keys and public keys can be conceived in various patterns. In the present preferred embodiment, one secret key is used to embed a digital watermark of personal identity into personal image data. The other secret key is separately used to encrypt personal identity. When recovering the personal identity, one public key corresponding to the former secret key is used to extract the personal identity as the digital watermark from the image. The other public key corresponding to the latter secret key is used to decrypt the personal identity. The personal identity is thus recorded on the IC card in the two forms: as the digital watermark and the cryptogram. After retrieval or decryption through separate steps, two strings of identity data are obtained and matching between both is performed to check for falsification. This matching check for falsification is, in a broad sense, judging whether data matching occurs between both.

Figure 5:
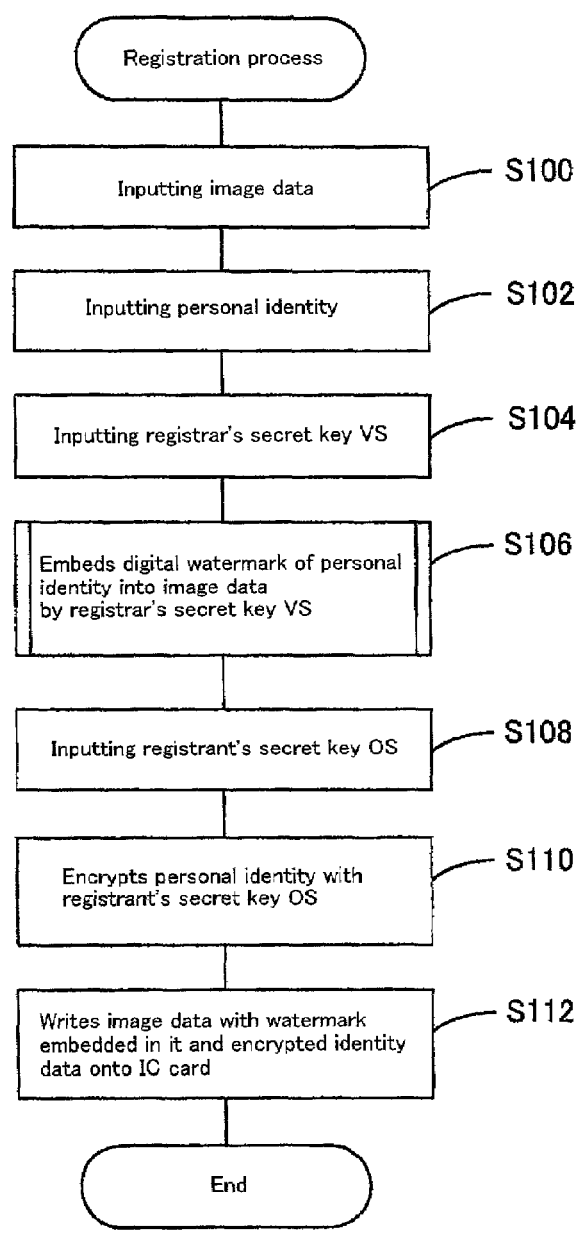
FIG. 5 is a flowchart illustrating the procedure of a registration process.
Figure 6:
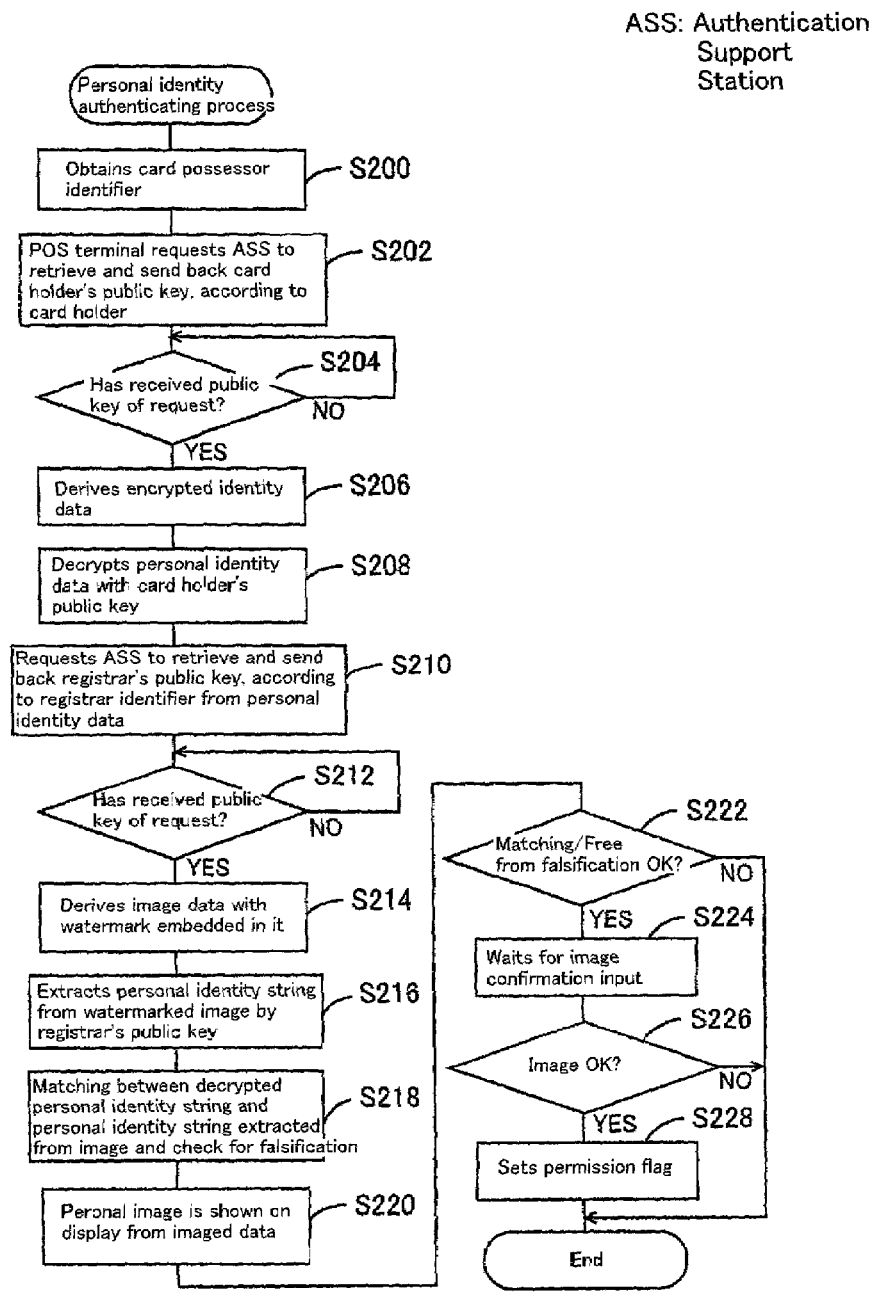
FIG. 6 is a flowchart illustrating the procedure of a personal identity authenticating process.
Figure 7:
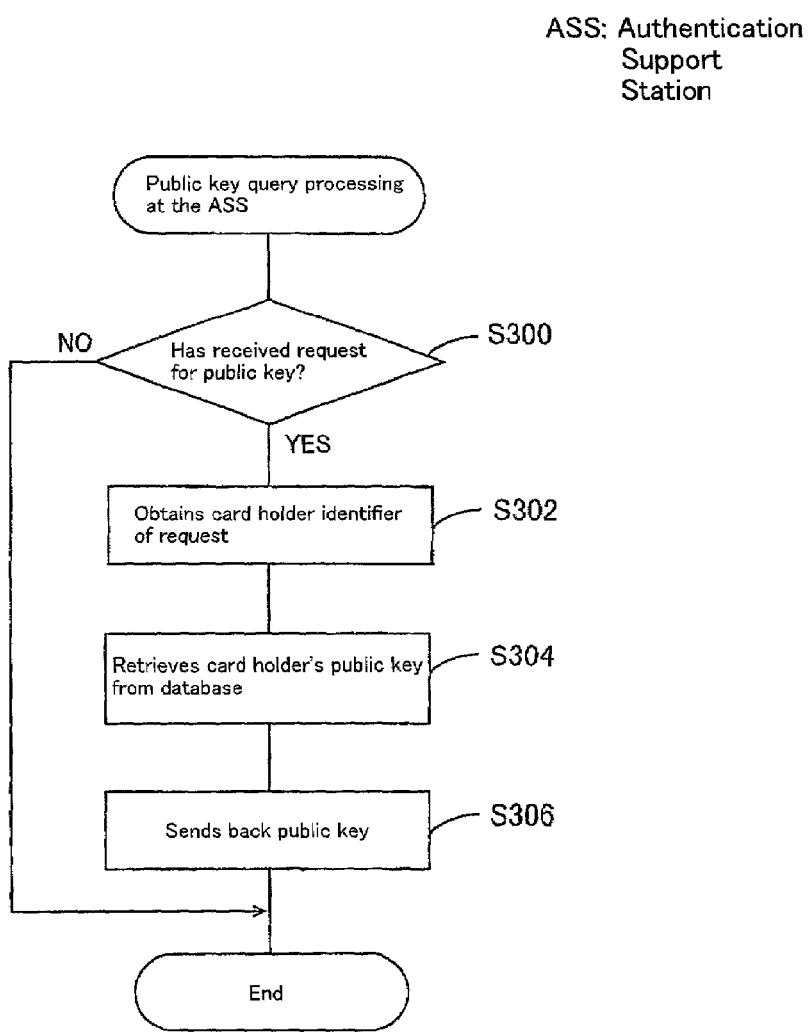
FIG. 7 is a flowchart illustrating the procedure of public key query processing at the authentication support station.

In the following, all processes involved in the present preferred embodiment will be explained one by one with reference to the flowcharts illustrative of the procedures thereof. FIG. 5 is a flowchart illustrating the procedure of a registration process to take place at the place of the registrar. FIG. 6 is a flowchart illustrating the procedure of a personal identity authenticating process to take place at the POS terminal. FIG. 7 is a flowchart illustrating the procedure of query processing to take place at the authentication support station that exercises public key management.

Refer to FIG. 5 illustrating the procedure in which a job of registering the identity of the registrant who is going to possess an IC card is executed on the registry terminal 50 operated by the registrar. In step S100, image data into which a digital watermark will be embedded is input to the registry terminal. As an example of the image data, an image representing a part of the registrant's body that serves the identification purpose can be used. The simplest one is his or her "face." Specifically, the registrant's face is captured by a digital camera 56 and digitized into digital image data. The digital image data is directly or temporarily stored into a storage medium such as a hard disk in the registry terminal, thereby inputting the image data is completed in the step S100.

In step S102, personal identity is input to the registry terminal. Information representing personal identity includes name, address, age, etc. which may vary, according to the application of the IC card. In the present preferred embodiment, the input personal identity data is written onto the IC card in two separate manners of cryptographic processing for later checking for falsification. The encrypted personal identity is decrypted later and put to matching. Thus, information such as name, address, age, etc. has no specific meaning as such. However, the registrar identifier is attached to the personal identity data to indicate what registrar executed the personal identity registration. The registrar identifier is necessary for obtaining its public key from the authentication support station 40.

Now, secret and public keys will be briefly explained. A secret key is paired with a public key and from one key, inferring the other key is nearly impossible. Both keys are exclusively connected with each other. Data encrypted with one key can be decrypted by only the other key and it is impossible to decrypt the data with the key used for encryption. For example, assume that data encrypted with the secret key of the identical person is transmitted to someone else who was notified of the public key paired with the secret key beforehand. The receiver of the data can decrypt it by using this public key. If a third party obtains both the transmitted encrypted data and the secret key of the identical person, it is impossible to decrypt the data.

The authentication support station 80 has a database of identifiers, public keys and secret keys, tabulated in a table which is shown in FIG. 8, and has a function of supplying the information of a public key of request, according to the specified identifier it receives. Secret keys are registered in the database, but, normally, their information is not supplied. As exemplary entries in the table shown in FIG. 8, public key VP and secret key VS are registered for the registrar identifier "AAA012345" and pubic key OP and secret key OS are registered for the registrant/cardholder identifier "BBB678901." There are diverse cryptosystems using public keys and secret keys, but the discussion thereof is out of the scope of this specification. The key identifiers VP, VS, OP, and OS are only symbolic, not representing any content.

In step S104, the registrant's secret key VS is input to the registry terminal. Because this secret key is the registrant's own key, a query to the above-mentioned authentication support station is not required. However, because the entry of this secret key is important and confidential, such a security measure can be taken that entering the secret key is exclusively performed by responsible personnel who is at a certain post or authorized to handle the key.

In step S106, the registry terminal embeds the digital watermark of the personal identity into the above image data by means of the registrar's secret key. Varieties of practical methods of embedding a digital watermark into an image have so far been proposed. For example, Japanese Patent Laid-Open Publication No. Hei 11-341268 (Kokai, No. 341268 of 1999) disclosed a technique of inserting digital watermark bits by using the 63rd coefficient in the 8×8 discrete cosine transformation according to the Joint Photographic Experts Group (JPEG) transformation. The 63rd coefficient represents the highest frequency component value and changing this value substantially does not affect the image. Because of its property, even if an image including the above bits embedded in it is subjected to JPEG expansion; it is substantially impossible for the naked eye to sense any least change to the image. The present personal identity authenticating system is not based on a restrictive, specific method of embedding a digital watermark into an image and a suitable method can be selected and adopted from among a variety of methods thereof.

In step S108, the secret key OS of the registrant who will be the cardholder is input to the registry terminal. Because the registrant has exclusive management of his or her secret key OS, the registrant himself or herself enters the secret key from the consoler 52. As the console, an independent console to be used for entering the key may be set up such that the registrant can operate it while being concealed from the view of other persons near it. In the next step S110, the registry terminal encrypts the personal identity data with the registrant's secret key OS input to it. The encrypted personal identity can be decrypted by the registrant's public key OP.

In the final step S112, the registry terminal writes the image data in which the digital watermark has been embedded by means of the registrar's secret key VS and the personal identity data encrypted with the registrant's secret key OS onto the IC card 20. As the result, the IC card 20 has the image data with the digital watermark embedded in it and the encrypted identity data recorded thereon as shown in FIG. 4. On the IC card 20, the registrant/cardholder identifier, which will be described later, similar to the registrar identifier, is assigned and recorded, and other basic data is of course recorded.

Figure 9:
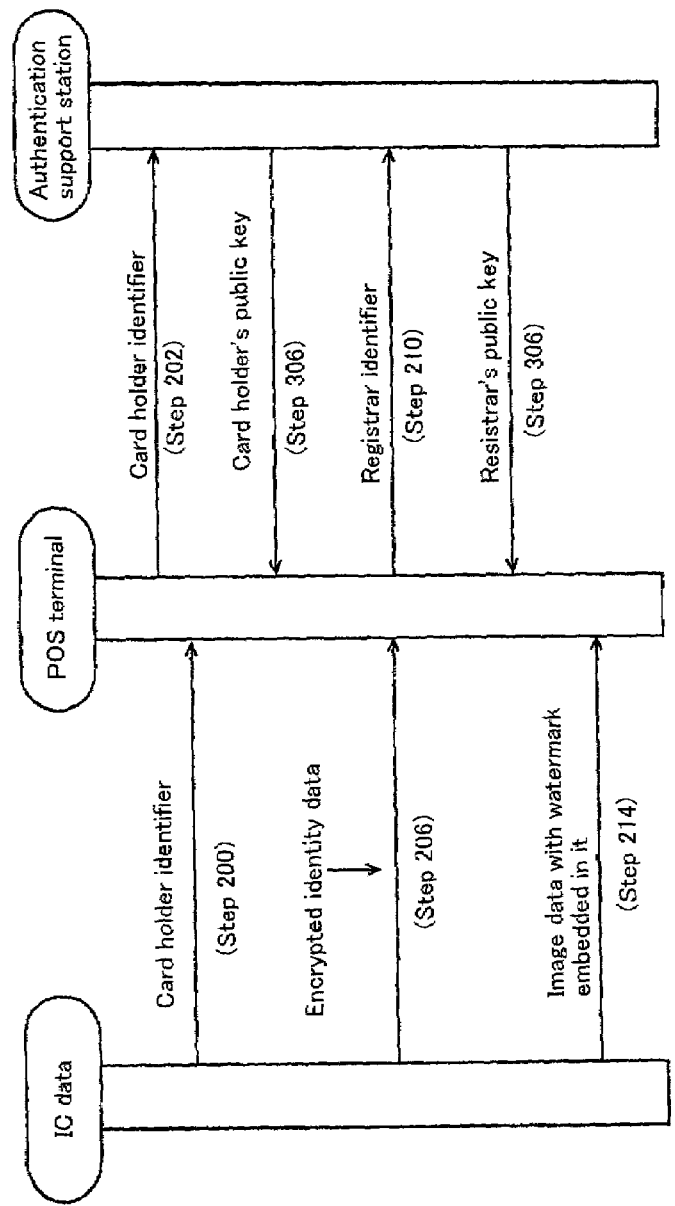
FIG. 9 is a diagram representing data flow from the IC card and between the POS terminal and the authentication support station.

After the registrant gets the IC card and becomes the cardholder, when the IC card 20 is used, the personal identity authenticating process is carried out on the POS terminal 10 in the procedure illustrated in FIG. 6. When, for example, the cardholder is going to buy something and pay with the IC card, he or she brings the commodity to buy to the counter where the POS terminal 10 is installed and has a clerk insert the IC card 20 into the IC card reader 14 of the POS terminal 10. Then, the process which will be explained below is carried out on the POS terminal 10. FIG. 9 shows the outline of data supplied from the IC card to the POS terminal and data transferred between the POS terminal and the authentication support station.

In step 200, the POS terminal first obtains the cardholder identifier of the IC card 20. The registrant/cardholder identifier recorded on the IC card 20 as described above is read by the card reader 14. In the next step S202, the POS terminal requests the authentication support station 40 to retrieve and send back the cardholder's public key OP, according to the cardholder identifier specified with the request.

The query processing takes place at the authentication support station (ASS) as illustrated in the flowchart of FIG. 7. In step 300, the ASS judges whether it has received a request for public key OP. If the ASS has received request, it obtains the cardholder identifier of the request. The ASS 40 has the keys management table as shown in FIG. 8 in which identifiers are mapped to public keys OP. Instep S304, the ASS retrieves the cardholder's public key OP of the request from the database by using the cardholder identifier as the search key. In step S306, the ASS sends back the retrieved public key OP to the POS terminal. A predetermine security check is assumed to be performed for the request for public key OP, but the explanation thereof is omitted herein. If the ASS has not received a request for public key OP in the step S300, it exits from the procedure without executing the above processing; instead executing another processing which is not shown.

Returning to FIG. 6, the process on the POS terminal 10, for the meantime, the POS terminal waits for the reception of the cardholder's public key OP from the ASS in step S204. Upon receiving it, the POS terminal derives the encrypted identity data from the IC card 20 in step S206 and decrypts the identity data with the received cardholder public key OP in step S208, thus decoding the personal identity.

The registrar identifier has been attached to the personal identity data as described above. In step S210, thus, the POS terminal obtains the registrar identifier and requests the ASS 40 to retrieve and send back the registrar's public key VP, according to the registrar identifier with the request. According to the flowchart of FIG. 7, as described above, the ASS 40 then retrieves the registrar's public key from the database by using the registrar identifier as the search key (step S304) and sends back the registrar's public key VP (step S306). On the other hand, on the POS terminal 10 side, as illustrated in FIG. 6, the POS terminal 10 waits for the reception of the registrar's public key VP from the ASS in step S212. Upon receiving it, the POS terminal derives the image data with the watermark embedded in it from the IC card 20 in step S214. In step S216, the POS terminal extracts the personal identity string from the watermarked image by means of the received registrar's public key VP.

During this process of extracting the watermark from the image by means of the public key VP, it is possible to judge whether the watermarked image data has been falsified. For example, its falsification may make it impossible to extract the watermark itself from the image. Check for falsification to the watermarked image data can also be performed by the comparison between the hashed value obtained during extracting the watermark and the hashed value of the watermarked image data. Alternatively, it is also possible to encrypt a hashed value with a secret key and embed the encrypted hashed value as a watermark into the image. In this case, the original hashed value is recovered by extracting the encrypted hashed value from the watermarked image data and decrypting it with the relevant public key, and during this process, falsified image data can be detected.

In the manner described above, one personal identity string is retrieved from the encrypted identity data and another personal identity string is retrieved from the image data with the watermark embedded in it. These two strings are obtained due to that personal identity has been encrypted with separate secret keys OS and VS. Moreover, the registrar identifier can be obtained only after the encrypted identity data is decrypted. Usually, the cardholder has no connection with the registrar and there are no clues. There is almost no possibility that the registrar's public key is obtained from the outside. Most cardholders probably keep his or her secret key OS memorized in any form and the secret key OS may be stolen by accident, but it is impossible that the stealer can steal the registrar's secrete key vs as well. Of course, the possibility of happening of the above matters is not 0%. There is an additional condition that the stealer must complete everything for abusing the card before the IC card 20 user notifies the registrar of the loss of the card. Thus, the security of the card would be high.

Meanwhile, the POS terminal temporarily holds the cardholder and registrar identifiers and their public keys OP and VP inside it when both identity strings have been retrieved. As an example of the extreme case, it is conceivable that these identifiers and public keys are output and abused. However, if personal identity data and image data are generated and encrypted with the public keys OP and VP, the corresponding secret keys OS and VS are necessary for decrypting them. Therefore, even if such data have been obtained, the public keys OP and VP will be obtained when the IC card 20 is used at another POS terminal 10, but the data encrypted with the public keys OP and VP cannot be decrypted with the public keys OP and VP, and after all the IC card cannot be used.

In the next step S218, the POS terminal performs matching between both personal identity strings which have thus been obtained separately and checks for falsification. As the result of matching, if both strings do not agree, there is high possibility of the image data being falsified. If the digital watermark itself has a function to detect falsification as described above, the function can be used. It is also advisable to obtain a hashed value of the image data beforehand and embed it together with person identity as a digital watermark into the image data. After retrieving the original image data by separating the digital watermark from it, calculate a hashed value from the original image data and compare this hashed value with the hashed value encoded in the digital watermark, thus checking for falsification. This manner of matching can also be applied.

In step S220, the personal image is shown, based on the image from the image data with the watermark embedded in it on the display 13. In the present preferred embodiment, because the personal image can be recovered by directly expanding the image data based on the watermarked image data, the image maybe displayed before extracting the watermark from the image.

In step 222, the POS terminal judges whether the result of the above matching is OK or sees whether the image data is free from falsification. If OK in both respects, the POS terminal 10 waits for the input from its operator who makes sure that the displayed image is of the identical person in step S224. At this time, the personal image of the cardholder has already been shown on the display 13 in the above step S220. The operator of the POS terminal 10 compares the displayed image with the face of the cardholder. If the image appears to be of the identical person, the operator inputs confirmation OK. Then, in step S226, the POS terminal judges whether the confirmation of the identical person is OK for the displayed image. If OK, the POS terminal sets a permission flag in step S228 so that the permission flag can be referenced for further processing and terminates the personal identity authenticating process. This means the following: after it is ensured that the image data is free from falsification through the foregoing steps, the personal identity authentication is completed if the face image displayed from the image data and the face of the cardholder of the IC card 20 agree.

Eventually, the operator of the POS terminal 10 decides whether the cardholder's face is identical to the displayed face image and this decision and further processing are the same as the existing authentication procedure. During the procedure prior to this stage, the conventional authentication techniques were unable to ensure the security sufficiently. When, for example, a credit card is used, the cardholder is requested to sign a slip and the clerk judges whether the signature written by the cardholder is identical to the signature put to the card. However, if the card stealer and the clerk conspire together, it is possible to pay with the card as they agree on the signature matching even if it is assumed. Thus, the degree of the security of the procedure at the stage that decision involves the intervention of the clerk and later remains unchanged.

There is a risk that credit cards are abused in this way: if the card stealer practices writing a signature to imitate the signature put onto the credit card and comes to write it well enough to deceive a clerk, it is easy to pay with the card for purchases at a shop or the like. Even for a card with the cardholder's face photograph attached to it, if a card with an imitated photograph is made and the same magnetically-retained information is written onto the card, falsification cannot be detected easily. Therefore, the merit of completely preventing of falsification is immeasurable.

In the above-described preferred embodiment, the steps S206 and S214 in which encrypted data and watermarked image data are read from the IC card 20 and these steps are carried out by the read means. The steps S208 and S216 in which decryption and extracting personal identity from the watermarked image are executed and the step S218 in which matching and check for falsification are executed and these steps are carried out by the decryption and matching means. Furthermore, the step S220 in which the image is displayed and the step S224 in which image confirmation input is accepted and these steps are carried out by the image of identical person confirmation means. According to the result of the POS terminal operator's decision as well as the result of the matching check, the step S228 in which the permission flag is set and the steps S222 and S226 in which decision is made and branching occurs and these steps are carried out by the permission means by which the identical person is authenticated and the cardholder is permitted to use the card.

In the foregoing embodiment, the personal identity is embedded as a digital watermark into the personal image data by means of the registrar's secret key VS, while it is encrypted by the registrant/cardholder's secret key OS. In a broad sense, double encryption with different secret keys and decryption with separate public keys corresponding to the secret keys are performed in accordance with the present invention. Diverse modifications to this aspect of the invention are possible.

Figure 10:
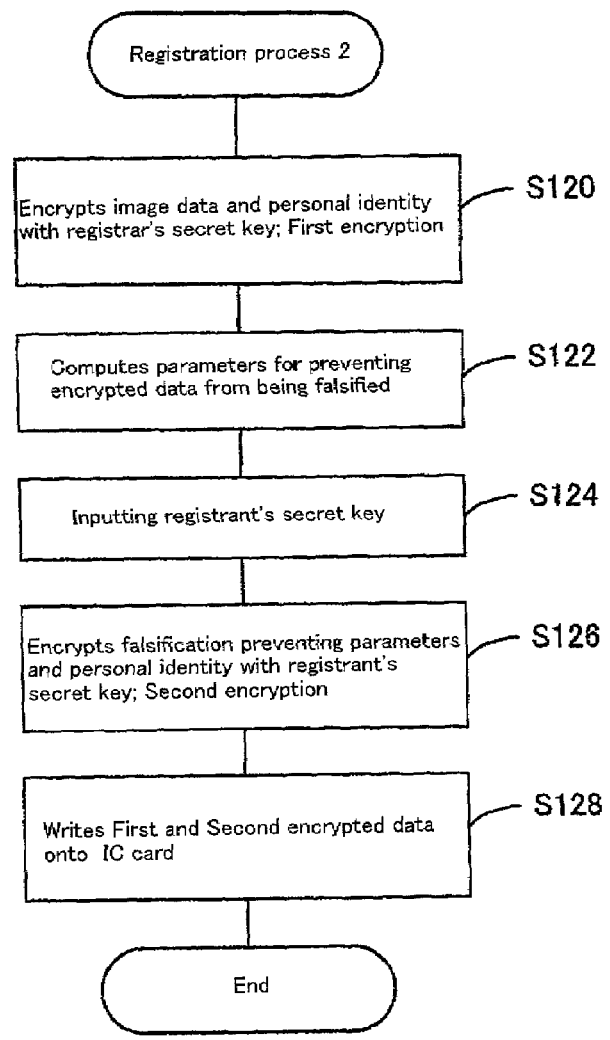
FIG. 10 is a flowchart illustrating the procedure of a modified registration process example.
Figure 11:
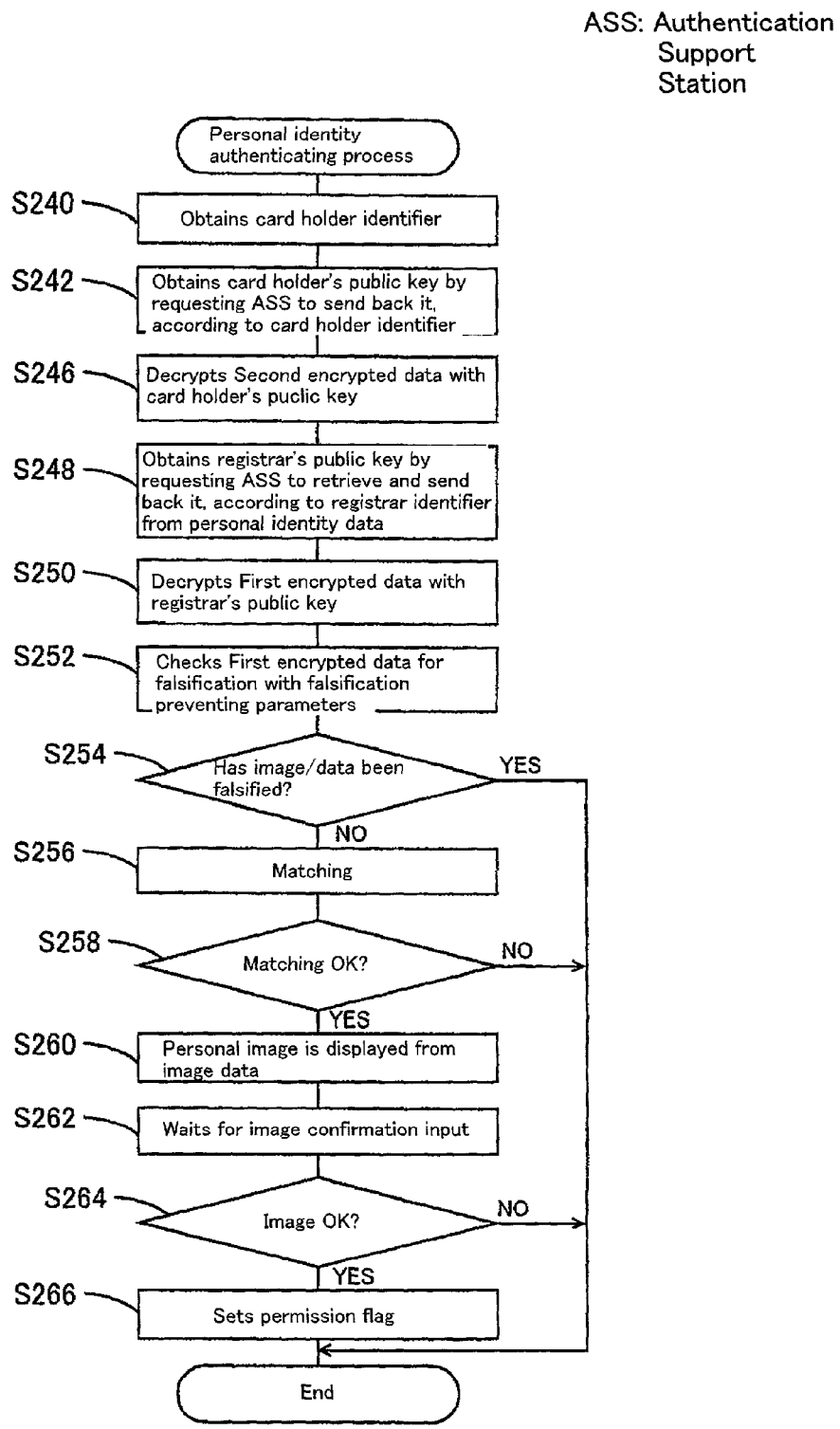
FIG. 11 is a flowchart illustrating the procedure of a modified personal identity authenticating process example.
Figure 12:
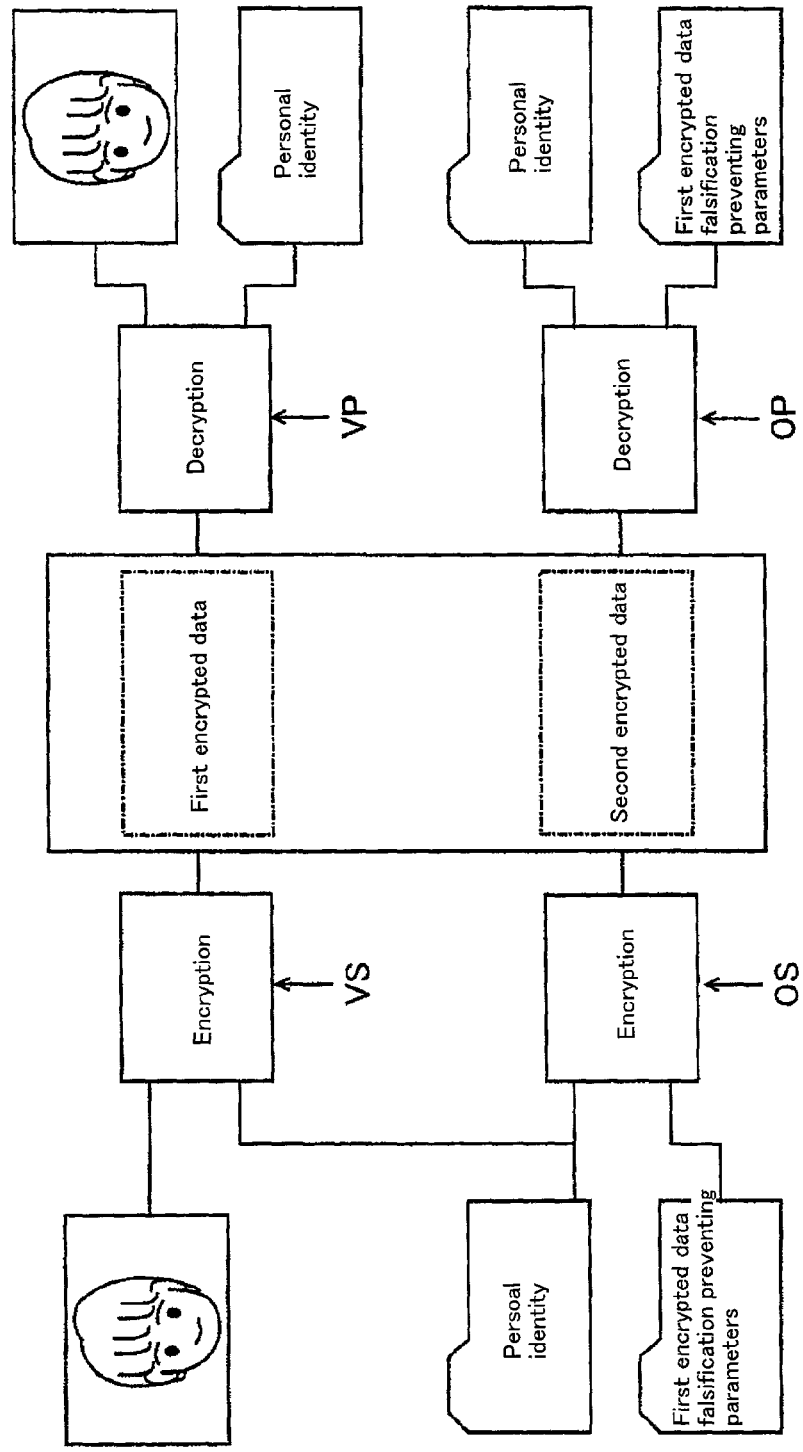
FIG. 12 is a schematic diagram representing a modified data encryption and decryption process example.

FIG. 10 is a flowchart illustrating another registration process 2 according to one example of such modifications. FIG. 11 is a flowchart illustration another personal identity authenticating process 2 associated with the registration process 2. FIG. 12 shows the outline of encryption and decryption processing and data to be encrypted and decrypted.

In the modification example, to the registry terminal at the place of the registrar, image data is input as in the step S100 in FIG. 5 and personal identity is input as in the step S102, which is the same as in the foregoing embodiment. However, in step S120 in FIG. 10, the image data and the personal identity data are encrypted with the registrar's secret key VS, but digital watermarking is not applied to the image. This encryption is referred to as first encryption processing and the encrypted data are referred to as first encrypted data.

In the next step S122, the registry terminal computes parameters for preventing the encrypted data from being falsified. Various algorithms can be applied to computing the parameters and the above-mentioned hashed value can be used. In step S124, from the console 52; the registrant who will be the cardholder inputs his or her secret key OS to the registry terminal.

Then, in step S126, the falsification preventing parameters and the personal identity data are encrypted with the registrant's secret key OS. This encryption is referred to as second encryption processing and the encrypted data are referred to as second encrypted data. The registrar identifier is attached to this personal identity data. After the second encryption, in step S128, the registry terminal writes the first and second encrypted data onto the IC card 20.

Referring to FIG. 11, on the other hand, the POS terminal 10 obtains the cardholder identifier by reading it from the IC card 2 in step S240. In step S242, the POS terminal requests the authentication support station (ASS) 40 to retrieve and send back the cardholder's public key OP, according to the cardholder identifier specified with the request. After a predetermined security check and the key retrieval in the same way as in the foregoing embodiment, the ASS 40 sends back the cardholder's public key VP to the POS terminal. Instep S246, the POS terminal decrypts the second encrypted data from the IC card 20 with the cardholder's public key OP.

Because the registrar identifier has been attached to the personal identity data included in the second encrypted data, the POS terminal has now obtained the registrar identifier by decryption. In step S 248, the POS terminal requests the ASS 40 to retrieve and send back the registrar's public key VP, according to the registrar identifier specified with the request. After a predetermined security check and the key retrieval in the same way as in the foregoing embodiment, the ASS 40 sends back the registrar's public key VP to the POS terminal. In step S250, the POS terminal decrypts the first encrypted data from the IC card 20 with the registrar's public key VP.

When the second encrypted data has been decrypted, the falsification preventing parameters and personal identity data are obtained. Instep S252, the POS terminal checks the first encrypted data for falsification, using the falsification preventing parameters. If the cardholder's face photograph is falsified, as described above, the security will be the same degree as for conventional similar cards with the cardholder's face photograph. In the present modification, however, the image data is encrypted with the registrar's secret key VP and the parameters to be used for checking for falsification are encrypted with the cardholder's secret key. Thus, the possibility of the image and data being falsified would be extremely low.

In step S254, according to the result of the check for falsification, branching occurs. If the image and data are free from falsification, the POS terminal performs matching between both identity strings respectively retrieved from the first and second encrypted data in a further step S256. If the result of matching is OK, the image from the image data obtained by decrypting the first encrypted data is shown on the display 13 in step S260.

When the cardholder's face image is shown on the display 13, the POS terminal 10 waits for the input from its operator who makes sure that the displayed image is of the identical person in step S262. The operator of the POS terminal 10 compares the displayed image with the face of the cardholder. If the image appears to be of the identical person, the operator inputs confirmation OK. Then, in step S264, the POS terminal judges whether the confirmation of the identical person is OK for the displayed image. If OK, the POS terminal sets a permission flag in step S266 so that the permission flag can be referenced for further processing and terminates the personal identity authenticating process.

This example of modification differs from the foregoing embodiment in that the image data is encrypted, but digital watermarking is not applied to it. However, two pairs of secret keys and public keys are used, one pair belonging to the registrant/cardholder and the other belonging to the registrar. Unless encryption/decryption is completed using at least one pair, it remains unknown that the other pair of secret and public keys belongs to whom. Thus, the security is extremely high.

Figure 13:
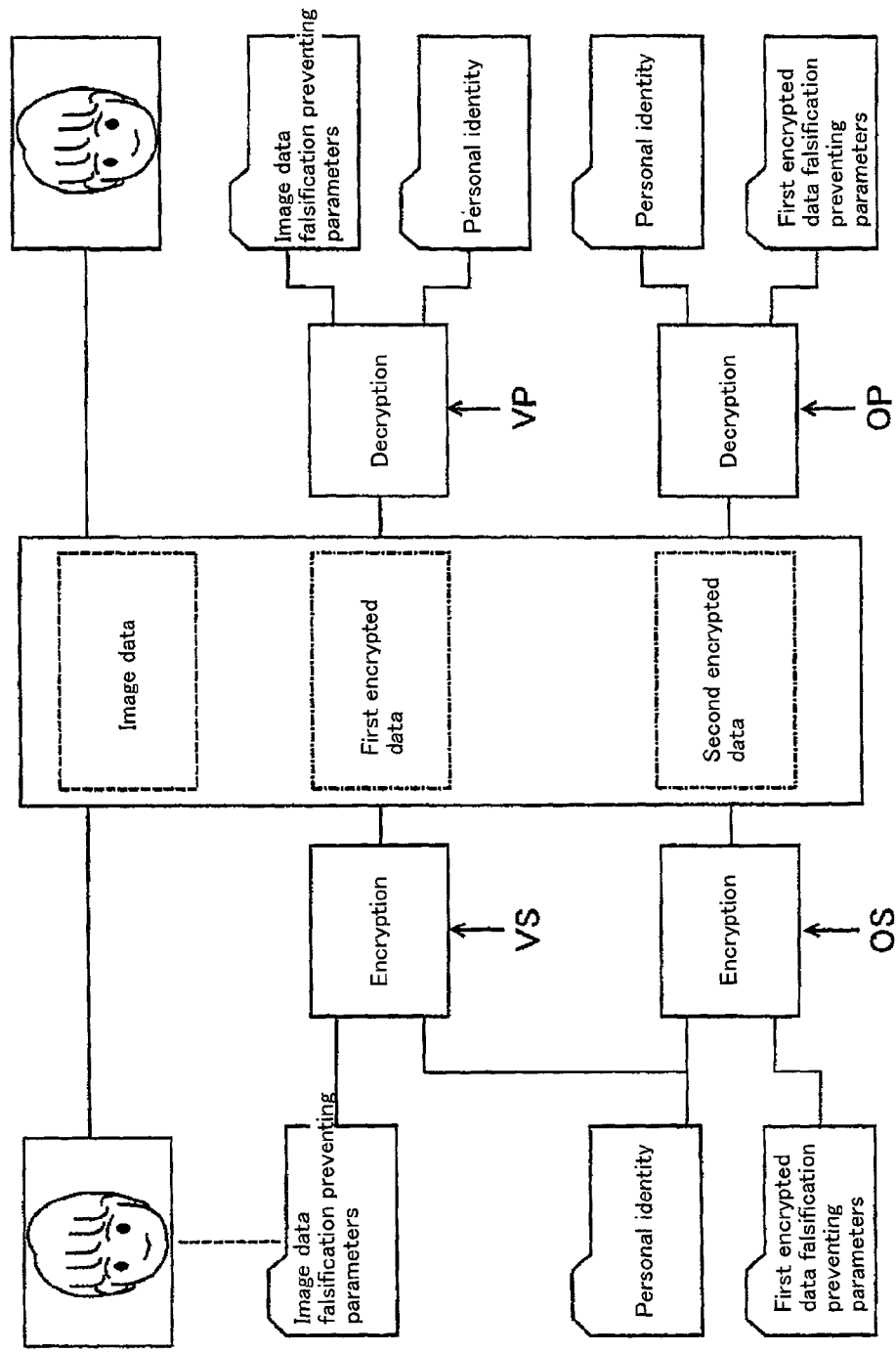
FIG. 13 is a schematic diagram representing another modified data encryption and decryption process example.

Anther example of possible modification is shown in FIG. 13. This modification is as follows. The image data is not encrypted, but its falsification preventing parameters and personal identity are encrypted with the registrar's secrete key VS, thus generating first encrypted data. For the first encrypted data, the falsification preventing parameters are computed. Then, the falsification preventing parameters and personal identity are encrypted with the registrant's secret key OS, thus generating second encrypted data.

In this case, the POS terminal obtains the registrant/cardholder's public key OP by requesting the ASS to retrieve and send back it, according to the cardholder identifier that is specified with the request. The POS terminal decrypts the second encrypted data with the cardholder's public key, when the registrar identifier is obtained from the decrypted personal identity data. The POS terminal obtains the registrar's public key VP by requesting the ASS to retrieve and send back it, according to the registrar identifier that is specified with the request. The POS terminal decrypts the first encrypted data with the registrar's public key. At this time, falsification to the first encrypted data can be detected. Furthermore, falsification to the image data can be detected, based on the falsification preventing parameters for the image data decrypted. Consequently, the security of the image data is assured almost completely.

Figure 14:
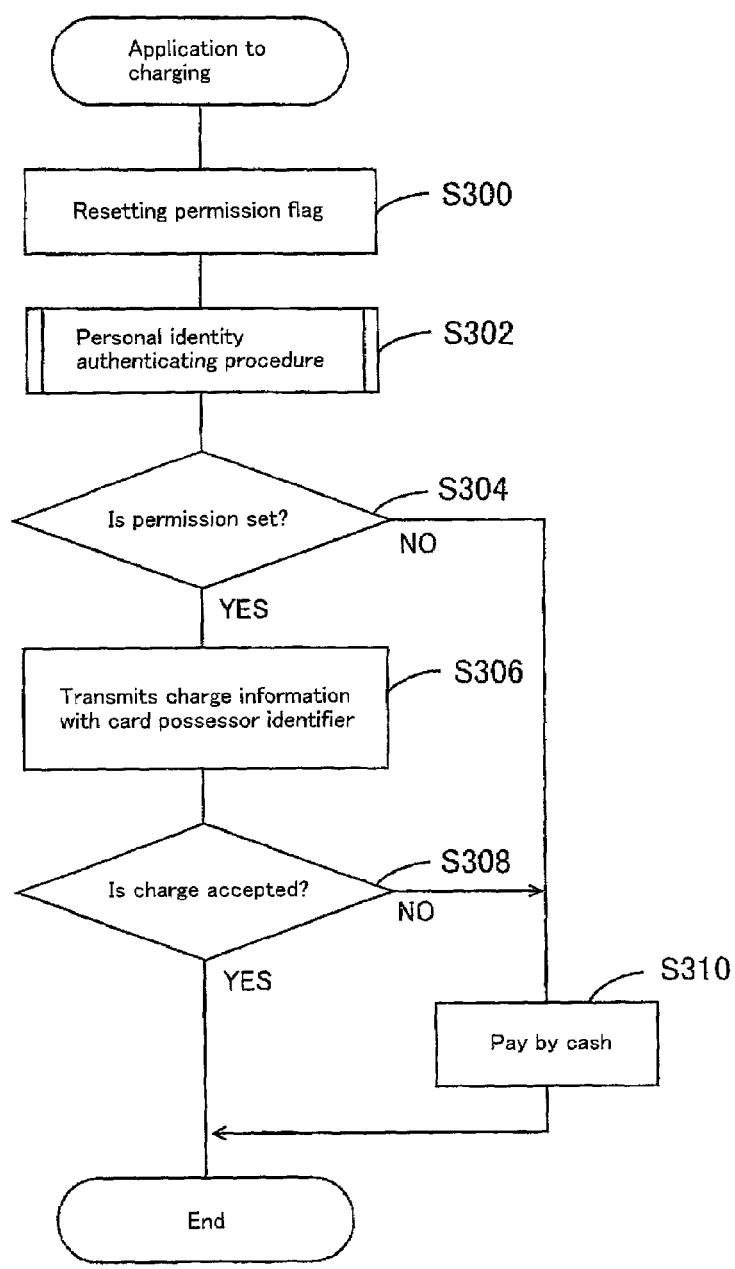
FIG. 14 is a flowchart illustrating invention application to charging.

Meanwhile, FIG. 14 is a flowchart illustrating an example of application of the above-described personal identity authenticating method to charging when the cardholder buys something and pay with the card or pay a bill or check with the card.

After the permission flag is reset in step S300, the above-described personal identity authenticating procedure is carried out in step S302. If the identical person as the cardholder is authenticated by the above procedure, the permission flag is set. In step S304, the permission flag is referenced, thereby the result of authentication is known. If permission is set, charge information with the cardholder identifier is transmitted to the appropriate site in step S306. Hereon, it is assumed that the card is a credit card and the charge information with the cardholder identifier is transmitted to a workstation at the credit card issuer. of course, the charging procedure may be varied as the case may be.

The card issuer's workstation, on the other hand, makes a judgment as to whether to accept the charging information transmitted to it in step S308. The workstation may not accept the charging information if the card issuer has been notified that the IC card 20 has been lost by being stolen or for other reason. In such cases, the cardholder is requested to pay by cash in step S360 even if he or she has been authenticated. Unless permission is set in the above step S304 after the authentication procedure, the cardholder must pay by cash in the step S310.

Figure 15:
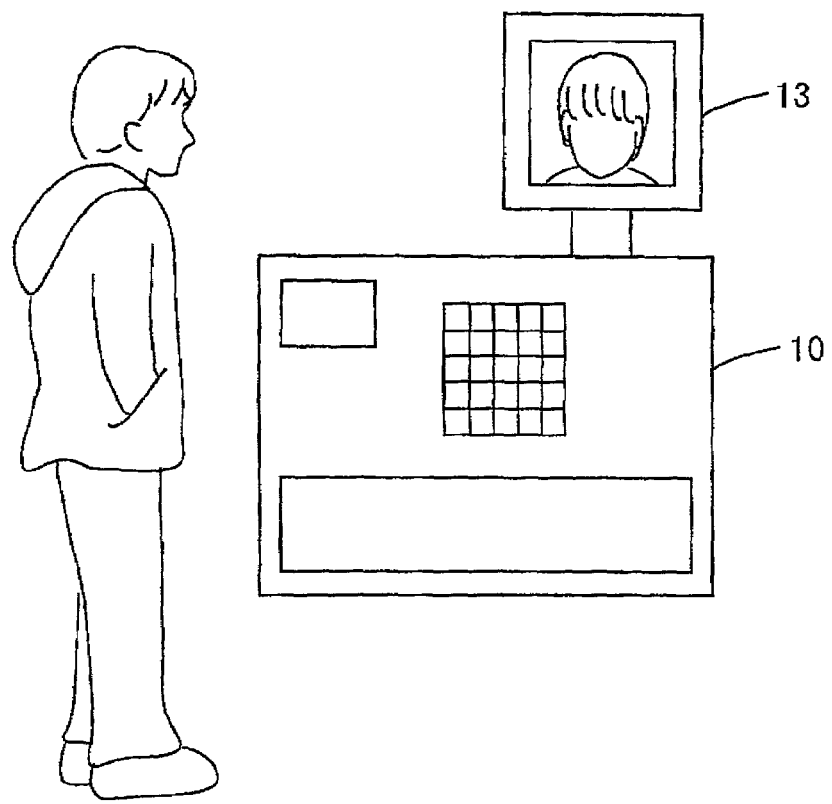
FIG. 15 is a schematic drawing representing an invention application example when face image data is used.

The image data is used for the POS terminal operator to confirm that the card user is the identical person and the cardholder's face photograph was used as the image data in the foregoing embodiment. FIG. 15 shows the POS terminal 10 with the personal face image being shown on its display 13 from the image data recorded on the IC card which is used when buying something or paying a bill or check. The operator of the POS terminal 10 makes sure whether the cardholder is the identical person by comparing the cardholder's face and the face image shown on the display and performs the above-mentioned image confirmation input when the cardholder is authenticated.

Figure 16:
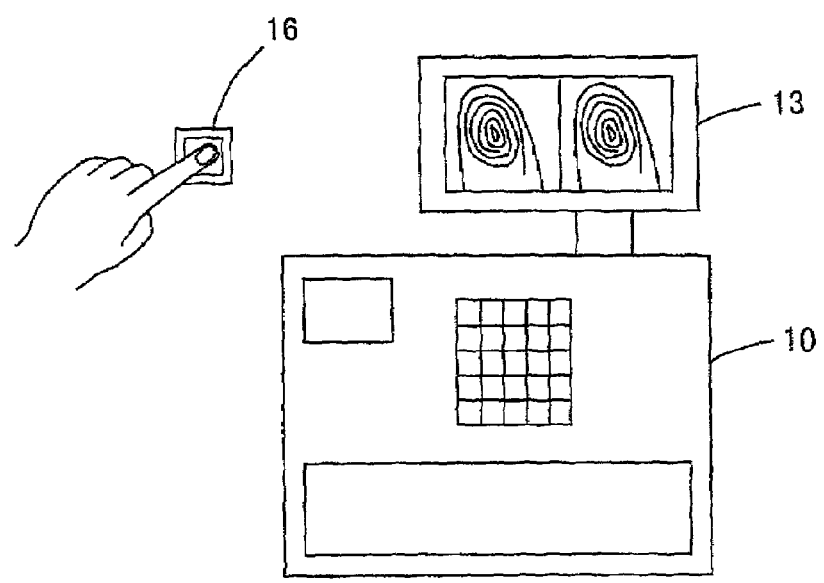
FIG. 16 is a schematic drawing representing an invention application example when fingerprint image data is used.

As an alternative method of confirming that the card user is the identical person, based on the image displayed, for example, the FIG. 16 shows the POS terminal with fingerprints being shown on its display. The display area on the display 13 is divided into the left and right parts. When the cardholder puts his or her finger on a fingerprint scanning pad 16 attached to the POS terminal 10, the fingerprint is scanned and displayed in one area of the display. In the other area, a fingerprint that was scanned and recorded as image data is displayed from the IC card. It may be difficult for the POS terminal 10 operator to decide between a match and mismatch between both fingerprints; in this case, software processing to check matching between both fingerprints may be executed. Of course, displaying the fingerprints has some merit. If matching cannot be verified by software, but the POS terminal 10 operator judges that both are identical by visually checking the actually displayed fingerprints side by side, priority can be given to the operator's judgment.

Figure 17:
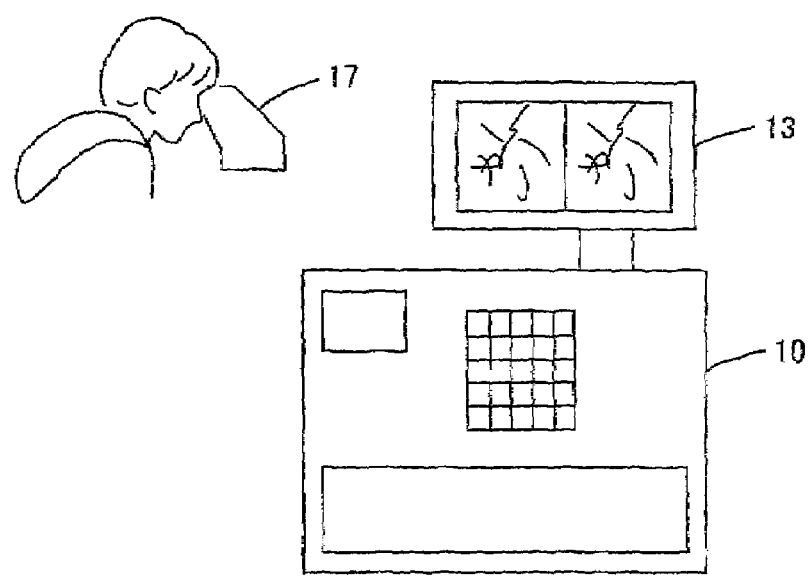
FIG. 17 is a schematic drawing representing an invention application example when eyeground photograph image data is used.

FIG. 17 represents another method of confirming that the card user is the identical person by using eyeground photographs. As the fingerprints do, eyeground photographs also have absolute personal peculiarity. Judgment can be made in almost the same way as in the above example where the footprints are used, except that an eyeground photographing device 17 is used.

Figure 18:
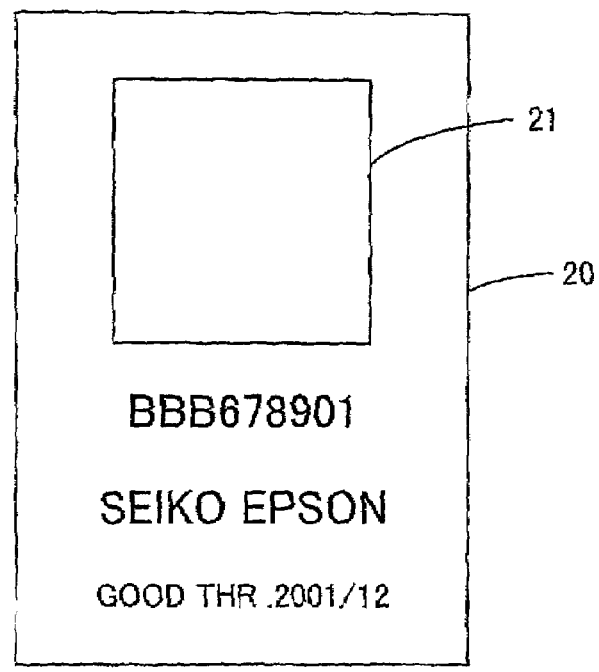
FIG. 18 shows the appearance of a modified IC card example.

In the foregoing, the POS terminal 10 was assumed equipped with the display 13, whereas it is possible to equip the IC card 20 with a display 21 as is shown in FIG. 18. As an example of the alternative to the IC card with a display, a handy device having a display as an integral part, for example, a PDA (Personal Display Assistant) terminal is available. By storing the same data that is recorded on the IC card 20 into its memory, a device such as the PDA can function as the IC card with a display. A mobile or handy telephone with a display can also be used as the alternative.

When the present invention is embodied with a mobile telephone having the IC card function, it is convenient that charging in conjunction with telephone charges is possible. If, for example, the mobile telephone user falls behind in his or her payment of telephone charges, charging is inhibited. In this way, abuse of the IC card function can be prevented. For short-term use of credit, by setting the maximum credits low, the loss, even if occurs, can be minimized. If the user wants more credits granted even for short-term use, request to deposit some money beforehand should be issued to the user, so that wrong use can be prevented while inconvenience is eliminated.

Meanwhile, on the condition that commodity sellers have an account for settling accounts of telephone charges so that the money collected from purchasers will be paid to the account, only the sellers having previous results of use can use this credit system. Generally, mobile telephone charges are deferred payment and the telephone user can prepare money for payment after confirming the details on the charges. Therefore, by checking the details, the user can find out dubious charges. Because payment to the account of the seller takes place only after the check, ill-intended, false charging will be disclosed before payment and its recovery becomes impossible.

In this sense, not only mobile telephones, but also general-purpose communication terminal devices provided with a charging system can be used to function as the above-described IC card in the present invention.

As explained above, a personal identity authenticating system of extremely high security for payment with IC card or the like can be built. The registrant/cardholder and the registrar are assigned their specific identifiers and their secret keys and public keys are managed, mapped to the identifiers at the authentication support station (ASS). Personal identity to which the registrar identifier is attached is encrypted with the registrant/cardholder's secret key. In addition, personal identity is embedded as a digital watermark into image data by means of the registrar's secret key. Both encrypted identity data and watermarked image data are recorded onto the IC card 20. When personal identity authentication is required, the encrypted identity data with the registrar identifier is decrypted with the cardholder's public key which is obtained by requesting the ASS to supply it, according to the cardholder identifier specified with the request. Similarly, the registrar's public key is obtained from the ASS by using the decrypted registrar identifier. By using the thus obtained registrar's public key, the personal identity is retrieved from the watermarked image data. Eventually, internal authentication is executed by matching between the separately obtained personal identity strings and checking the image data for falsification.

The present invention may be embodied in other specific forms without departing from the spirit or essential characteristics thereof. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within the scope of the claims.

What is claimed is:

1. A personal identity authenticating system comprising:
   an authentication support station at which secret key and public key pairs are managed such that each pair is mapped to the identifier of a registrant or registrar to which the pair belongs;
   a registry terminal which encrypts image data and identity data and writes encrypted data onto a recording medium; and
   a personal identity authenticating terminal which reads the encrypted data from said recording medium, decrypts said image data and said identity data, and checks the decrypted data for consistency of its contents,
   wherein:
   said registry terminal receives and stores the input of image data generated by capturing a part of the body of the registrant, and the input of the registrant's identity data, encrypts the identity data with the registrant's secret key and with the registrar's secret key respectively, and writes the image data and encrypted identity data onto said recording medium of the registrant,
   said personal identity authenticating terminal decrypts the double encrypted data respectively with the registrant's and registrar's public keys which are obtained from said authentication support station by specifying either the registrant or registrar identifier and performs matching between both identity data decrypted with each public keys, and moreover presents a image from said image data and accepts the input of confirmation.

2. The personal identity authenticating system according to claim 1, wherein:
   said registry terminal encrypts said image data and said identity data together with the registrar identifier with the registrant's secret key and encrypts said image data and said identity data with the registrar's secret key; and
   said personal identity authenticating terminal obtains the registrant's public key from said authentication support station by specifying registrant identifier and decrypts the encrypted data including the registrar identifier with the registrant public key, and moreover obtains the registrar's public key from said authentication support station by specifying the registrar identifier obtained by the preceding decryption and decrypts the remaining encrypted data with the registrar's public key.

3. The personal identity authenticating system according to claim 1, wherein:
   during the encryption process on the registry terminal, parameters for preventing data encrypted by either the registrant's secret key or registrar's secret key from being falsified are included in encrypting data with the other secret key; and
   said personal identity authenticating terminal obtains the falsification preventing parameters by decrypting the data including the parameters with either registrant's public key or the registrant's public key and checks the other data for falsification by using the thus obtained parameters.

4. The personal identity authenticating system according to claim 1, wherein:
   said registry terminal embeds a digital watermark consisting of said identity data into said image data by means of the registrar's secret key; and said personal identity authenticating terminal extracts the identity data from the watermarked image data by means of the registrar's public key.

5. A method of authenticating personal identity, using secret key and public key pairs which are managed such that each pair is mapped to the identifier of a registrant or registrar to which the pair belongs at an authentication support station, said method comprising:
encrypting image data and identity data and writing encrypted data onto a recording medium at a registry site; and
reading the encrypted data from said recording medium, decrypting said image data and said identity data, and checking the decrypted data for consistency of its contents at a personal identity authenticating site;
at the registry site, said method further comprising:
receiving and storing the input of image data generated by capturing a part of the body of the registrant;
receiving and storing the input of the registrant's identity data;
encrypting the identity data with the registrant's secret key;
encrypting the identity data with the registrar's secret key; and
writing the image data and encrypted identity data onto said recording medium of the registrant;
at the personal identity authenticating site, said method further comprising:
decrypting the double encrypted data respectively with the registrant's and registrar's public keys which are obtained from said authentication support station by specifying the registrant or registrar identifier;
performing matching between both identity data decrypted with each public keys;
presenting a personal image from said image data; and
accepting the input of confirmation.

6. A computer readable medium having a personal identity authenticating program recorded thereon, said program based on authentication using secret key and public key pairs which are managed such that each pair is mapped to the identifier of a registrant or registrar to which the pair belongs at an authentication support station, said program comprising:
a subprogram to run on a registry workstation for encrypting image data and identity data and writing encrypted data onto a recording medium; and
a subprogram to run on a personal identity authenticating workstation for reading the encrypted data from said recording medium, decrypting said image data and said identity data, and checking the decrypted data for consistency of its contents;
said subprogram to run on a registry workstation comprising the functions of:
receiving and storing the input of image data generated by capturing a part of the body of the registrant;
receiving and storing the input of the registrant's identity data;
encrypting the identity data with the registrant's secret key;
encrypting the identity data with the registrar's secret key; and
writing the image data and encrypted identity data onto said recording medium of the registrant;
said subprogram to run on a personal identity authenticating workstation comprising the functions of:
decrypting the double encrypted data respectively with the registrant's and registrar's public keys which are obtained from said authentication support station by specifying the registrant or registrar identifier;
performing matching between both identity data decrypted with each public keys;
presenting a personal image from said image data; and
accepting the input of confirmation.

7. A method of registering personal identity authenticating information, using secret key and public key pairs which are managed such that each pair is mapped to the identifier of a registrant or registrar to which the pair belongs at an authentication support station, said method comprising:
receiving and storing the input of image data representing the peculiarity of a person, the registrant who will be the cardholder of an IC card;
receiving and storing the input of identity data of said registrant;
encrypting said image data and said identity data by means of the registrar's secret key;
encrypting said identity data together with the registrar identifier by the registrant's secret key; and
recording the encrypted data on the IC card, thus registering the identity of the registrant.

8. A method of verifying personal identity authenticating information, using secret key and public key pairs which are managed such that each pair is mapped to the identifier of a registrant or registrar to which the pair belongs at an authentication support station, said method comprising:
obtaining the public key of the cardholder of an IC card from said authentication support station by specifying the cardholder identifier;
decrypting one encrypted data from the IC card with said public key, thereby retrieving the identity data and the registrar identifier;
obtaining the public key of the registrar from said authentication support station by specifying the registrar identifier;
decrypting the other encrypted data from the IC card with the registrar's public key, thereby retrieving the identity data and image data;
checking the retrieved data for falsification; and
rendering the result of the check and the image data usable.

* * * * *